United States Patent
Yang

(10) Patent No.: US 7,789,208 B2
(45) Date of Patent: Sep. 7, 2010

(54) SHOCK ABSORBER FOR ACHIEVING LINEAR DAMPING FORCE CHARACTERISTICS

(75) Inventor: Seung Guk Yang, Iksan-si (KR)

(73) Assignee: Mando Corporation, San Francisco, CA (US)

( * ) Notice: Subject to any disclaimer, the term of this patent is extended or adjusted under 35 U.S.C. 154(b) by 912 days.

(21) Appl. No.: 11/621,481

(22) Filed: Jan. 9, 2007

(65) Prior Publication Data

US 2007/0170028 A1  Jul. 26, 2007

(30) Foreign Application Priority Data

Jan. 23, 2006  (KR)  .................. 10-2006-0006809

(51) Int. Cl.
*F16F 9/34* (2006.01)
(52) U.S. Cl. ..................... 188/322.15; 188/282.63; 188/322.22
(58) Field of Classification Search ............ 188/322.15, 188/280, 282.4, 282.5, 282.6, 283.1, 281, 188/317, 322.13, 322.22
See application file for complete search history.

(56) References Cited

U.S. PATENT DOCUMENTS

| | | | | |
|---|---|---|---|---|
| 4,964,493 A | * | 10/1990 | Yamaura et al. | 188/282.6 |
| 4,993,524 A | * | 2/1991 | Grundei et al. | 188/282.6 |
| 5,042,624 A | | 8/1991 | Furuya et al. | |
| 5,316,113 A | * | 5/1994 | Yamaoka | 188/282.6 |
| 2004/0069581 A1 | | 4/2004 | Shinata | |
| 2005/0051395 A1 | | 3/2005 | Deferme | |

FOREIGN PATENT DOCUMENTS

| | | |
|---|---|---|
| JP | 09-287628 | 11/1997 |
| JP | 11 101292 A | 4/1999 |
| JP | 2002-295566 | 10/2002 |
| JP | 2003 042214 A | 2/2003 |
| JP | 2004-125023 | 4/2004 |
| JP | 2004-316900 | 11/2004 |
| JP | 2005-127374 | 5/2005 |
| JP | 2005-344911 | 12/2005 |
| WO | WO 92/16769 A1 | 10/1992 |

* cited by examiner

*Primary Examiner*—Pam Rodriguez
(74) *Attorney, Agent, or Firm*—McDermott Will & Emery LLP

(57) ABSTRACT

A shock absorber has a piston formed with a rebound channel and a valve mechanism for generating a damping force by controlling opening and closing and an opening degree of the rebound channel. The valve mechanism comprises a first valve disk having a hole and a slit communicating with the rebound channel respectively provided in inner and outer sides of the first valve disk, the first valve disk generating a first damping force by directing fluid through the slit; an auxiliary disk having a hole communicating with the hole of the first valve disk, the auxiliary disk being disposed to be in contact with a lower side of the first valve disk; and a second valve disk disposed to be in contact with a lower side of the auxiliary disk, the second valve disk being subjected to bending deformation by the fluid flowing through the holes of the first valve disk and the auxiliary disk to generate a second damping force.

6 Claims, 4 Drawing Sheets

SHOCK ABSORBER FOR ACHIEVING LINEAR DAMPING FORCE CHARACTERISTICS

BACKGROUND OF THE INVENTION

The present invention relates to a shock absorber, and more particularly, to a shock absorber for achieving generally linear damping force characteristics over the speed range of the shock absorber piston.

In general, a shock absorber is used in unison with a spring between a vehicle body and an axle to absorb a variety of vibrations or shocks transferred from the road to the wheel during driving conditions, thereby improving the ride comfort and handling stability. In more detail, the shock absorber improves the ride comfort by absorbing the free vibrations of its spring. Particularly, the shock absorber generates a damping force by using the fluid flow resistance during a stroke of a piston installed in the cylinder of the shock absorber.

FIG. 1 shows a section of a conventional shock absorber. A conventional shock absorber 100 includes a cylinder connected to an axle and a piston rod 120 connected to the vehicle body. The cylinder is comprised of an outer cylinder (not shown) and an inner cylinder 110. The piston rod 120 extends into the inner cylinder 110 and connects to a piston 130 in which compression and rebound channels 131, 132 are formed. The interior of the cylinder is divided by the piston 130 to form the compression chamber 112 and the rebound chamber 114. Further, an intake valve disk 141 for opening the compression channel 131 during a compression stroke is provided on top of the piston 130, and a valve mechanism 160 for controlling the opening and closing and the opening degree of the rebound channel 132 during a rebound stroke is provided on the bottom of the piston 130.

Particularly, the valve mechanism 160 of the conventional shock absorber as described above controls the opening degree of the rebound channel 132 in low and high speed ranges of the piston, thereby generating different damping forces. The particular configuration of the valve mechanism 160 is shown in an enlarged view in FIG. 1. As shown in the figure, the conventional valve mechanism 160 includes a nut 172, a washer 174, and a plurality of valve disks 162, 164 securely fixed to the lower side of the piston 130 by means of a retainer 176. Among them, the valve disk 162 has a slit 162a, which allows fluid to flow through. The slit 162a represents the smallest opening possible, which is used in generating a low speed damping force in a low speed rebound range of the piston 130. Thus, the valve disk 162 is referred to as "slit disk" or "disk-S." In addition, a plurality of the valve disks 164 are stacked on the bottom surface of the slit disk 162. The valve disks 164 are subjected to a bending deformation by the fluid passing through the aforementioned slit 162a in a high speed rebound range of the piston 130, this creates the largest opening possible and generates a high speed damping force.

However, in a process of generating the low speed damping force while the fluid passes through the slit 162a of the slit disk 162, the conventional shock absorber shows a nonlinear damping force characteristic, which is proportional to the square of the speed of the piston. Such a nonlinear damping force characteristic causes a damping force characteristic in a low speed range to be degraded, which deteriorates the ride comfort and handling stability of a vehicle. Further, in the conventional shock absorber the damping force in the low speed range is closely linked to the middle-high speed damping force (i.e., not enough degrees of freedom), so that if the low speed range is tuned, the middle-high range is also increased.

SUMMARY OF THE INVENTION

An embodiment of the present invention provides a shock absorber capable of achieving an approximately linear damping force characteristic by employing a valve mechanism for generating a two-step damping force in a low speed rebound range of a piston and capable of increasing the degrees of freedom in tuning the damping force.

A shock absorber has a piston formed with a rebound channel and a valve mechanism for generating a damping force by controlling opening and closing and an opening degree of the rebound channel. The valve mechanism according to the present invention comprises a first valve disk having a hole and a slit communicating with the rebound channel respectively provided in inner and outer sides of the first valve disk, the first valve disk generating a first damping force by directing fluid through the slit; an auxiliary disk having a hole communicating with the hole of the first valve disk, the auxiliary disk being disposed to be in contact with a lower side of the first valve disk; and a second valve disk disposed to be in contact with a lower side of the auxiliary disk, the second valve disk being subjected to bending deformation by the fluid flowing through the holes of the first valve disk and the auxiliary disk to generate a second damping force. Therefore, the present invention can improve a damping force characteristic of a low speed rebound range by means of a structure of generating a two-step damping force by first and second valve disks in a low speed rebound range of the piston, which contribute to achieving a generally approximately linear damping force characteristic.

In addition, the shock absorber according to the present invention may further comprise a third valve disk disposed to be spaced apart from the second valve disk, the third valve disk being subjected to bending deformation by the fluid passing the second valve disk to generate a third damping force. Preferably, there are a plurality of the auxiliary disks, the inner diameter of the holes of the auxiliary disks being gradually increased in a direction of fluid flow.

DETAILED DESCRIPTION OF EMBODIMENTS

Hereinafter, an embodiment of the present invention will be described in detail with reference to the accompanying drawings.

Figure 1:
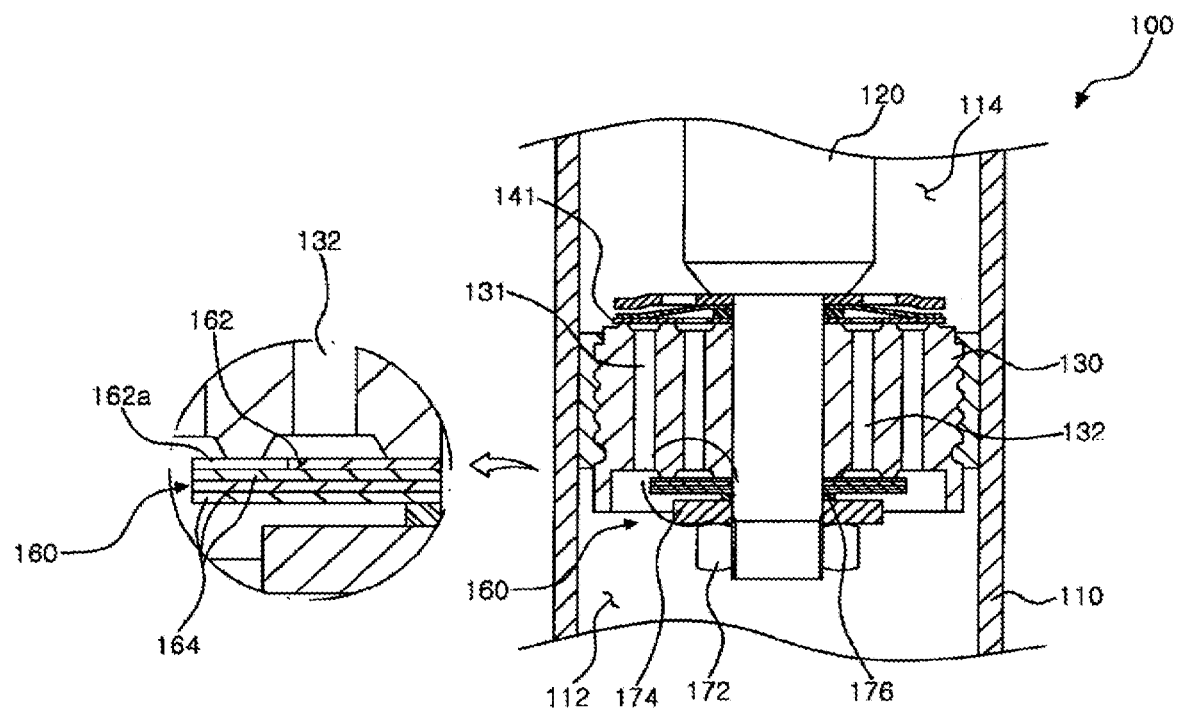
FIG. 1 is a partial sectional view illustrating a conventional shock absorber.
Figure 2:
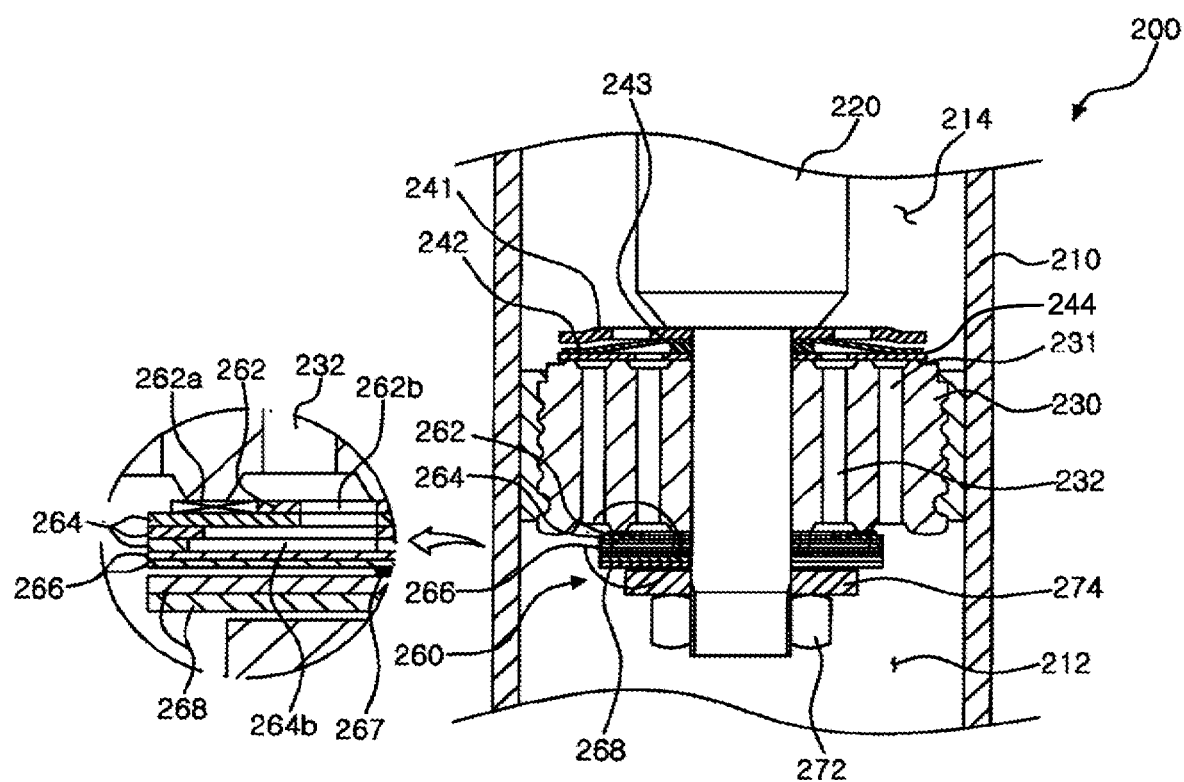
FIG. 2 is a partial sectional view illustrating a shock absorber according to an embodiment of the present invention.

FIG. 2 is a sectional view showing a portion of a shock absorber according to the embodiment of the present invention. As shown in the figure, a shock absorber 200 according to the present embodiment includes a piston 230 dividing an interior of a cylinder, more particularly, an inner cylinder 210 into a compression chamber 212 and a rebound chamber 214. The cylinder is connected to an axle, and the piston 230 is connected to a piston rod 220, which is connected to the vehicle body. In addition, the piston 230 includes compression channels 231 near the inner cylinder 210 and rebound channels 232 near the center of the piston 230. The compression and rebound channels 231, 232 are formed to allow the fluid to selectively flow between the compression and rebound chambers 212, 214 during the compression and rebound strokes in which the piston 230 rises and falls.

A washer 241, an intake spring 242, a retainer 243 and an intake valve disk 244 are stacked on top of the piston 230 in order from thereabove. The intake valve disk 244 is subjected to bending deformation with a fast response during compression stroke of the piston 230, thereby serving to open the compression channels 231. In the meantime, a rebound valve mechanism 260 which features in the present invention is provided in a lower portion of the piston 230. As will be described in detail below, the valve mechanism 260 is configured so as to generate an approximately linear damping force over the low, middle-low and high speed rebound ranges of the piston 230.

The valve mechanism 260 according to the embodiment of the present invention includes first to third valve disks 262, 266, 268, which are fitted around the piston rod 220 at a lower portion of the piston 230 and fixed to the piston rod 220 by means of a nut 272 and a washer 274. In addition, auxiliary disks 264 are disposed between the first and second valve disks 262, 266, and a retainer 267 is disposed between the second and third valve disks 266, 268 to space them apart from each other.

The first valve disk 262 is in contact with a lower surface of the piston 230 and directly faces the rebound channels 232. In addition, a peripheral portion of the first valve disk 262 is formed with a plurality of slits 262a, which partially overlap with the rebound channels 232 and allows fluid to flow out of the rebound channels 232. Also, the first valve disk 262 includes holes 262b, which generally communicate with the rebound channels 232.

The plurality (e.g., three) of auxiliary disks 264 are positioned under the first valve disk 262. The uppermost auxiliary disk is in contact with the bottom surface of the first valve disk 262, and the other auxiliary disks are stacked on the uppermost auxiliary disk to be in contact with each other. Particularly, the auxiliary disks 264 are provided with a plurality of holes 264b which gradually increase in diameter as they go down. These holes 264b communicate with the holes 262b of the first valve disk 262. The holes 264b allow the flow of the fluid passing through the rebound channels 232 and the holes 262b of the first valve disk 262. At this time, the first valve disk 262 and the auxiliary disks 264 keep a lower portion of the compression channels 231 to be opened by the combination of the slits and holes, which removes the necessity of a rebound retainer that has been required in a piston of a conventional shock absorber.

The second valve disks 266 are disposed under the auxiliary disks 264. The second valve disks 266 are disposed so as to be in contact with the lowermost one of the auxiliary disks 264, and are formed to be subjected to bending deformation by the fluid passing through the holes 264b of the auxiliary disks 264. The second valve disks 266 include a structure with two disks stacked in the present embodiment, but this does not limit the present invention. That is, the number, kind and/or thickness of the disks may be changed, thereby making it possible to design the valve mechanism for providing the manufacturer's desired damping force characteristic.

Finally, the third valve disks 268 are provided under the second valve disks 266. The third valve disks 268 are fixed to the piston rod 220 to be spaced apart by a predetermined gap from the second valve disks 266 by the retainer 267. In addition, the third valve disks 268, which also have a structure with a plurality, preferably two, of disks stacked, are configured so as to be subjected to bending deformation by the fluid flowing while the second valve disks 266 are subjected to the bending deformation. At this time, the number, kind and/or thickness of the third valve disks are also considered when the valve mechanism is designed.

Figure 3:
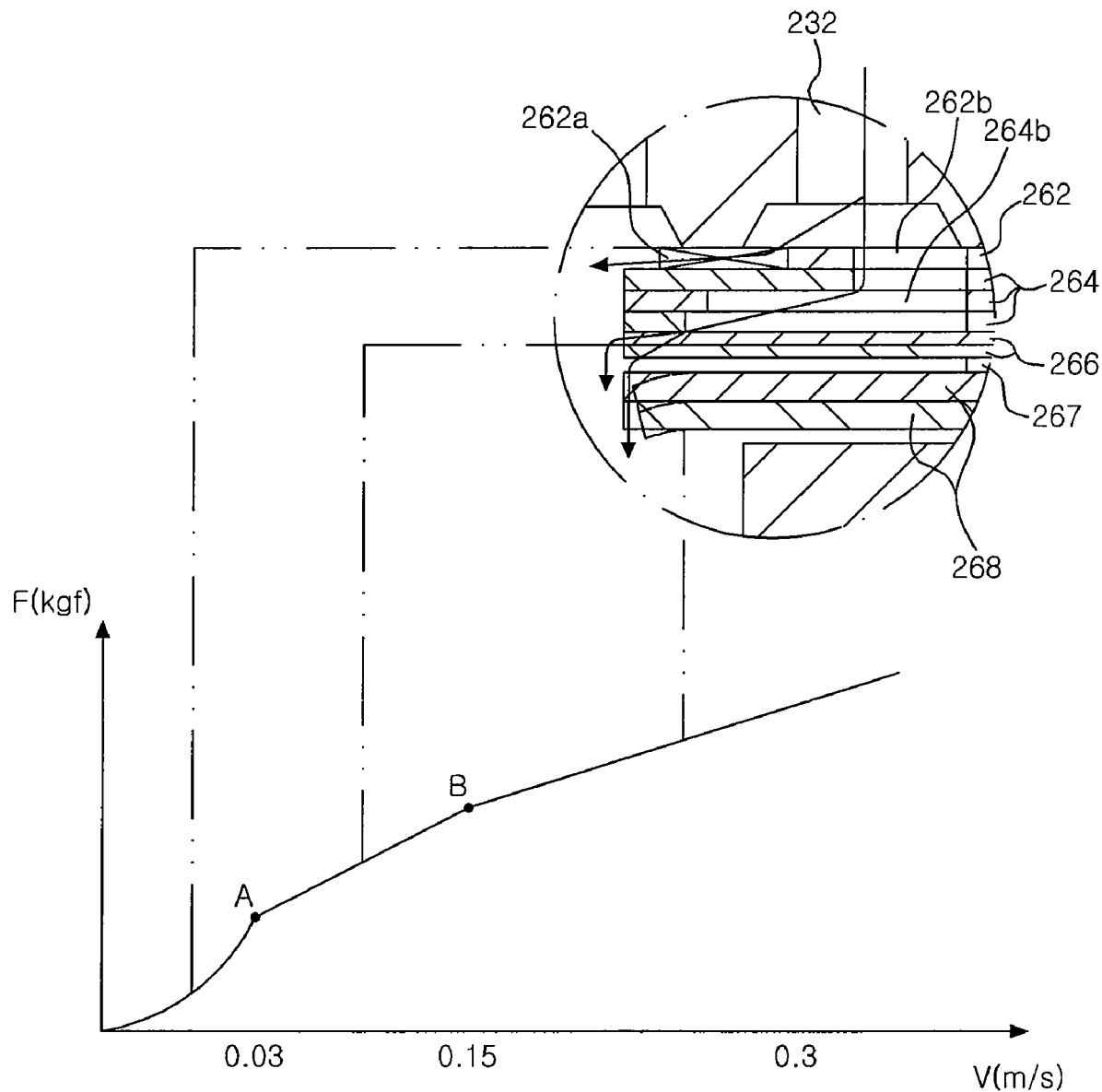
FIG. 3 is a view showing a valve mechanism for generating a damping force in the shock absorber shown in FIG. 2 together with a damping force graph anticipated from the valve mechanism.

FIG. 3 is a view showing the aforementioned valve mechanism together with a graph of the predicated damping force from the valve mechanism in order to describe the operation of the shock absorber according to the present embodiment.

As shown in FIGS. 2 and 3, in a low speed rebound range of the piston, the first valve disk 262 first takes part in the generation of a damping force. That is, in the initial low speed rebound range, the fluid passes through the slits 262a of the first valve disk 262 and generates fluid resistance (or oil resistance), thereby generating and controlling an initial low speed damping force. Then, when the rebound speed of the piston 230 is increased and therefore the pressure in the rebound chamber 214 is also increased, the fluid passes through the holes 262b of the first valve disk 262 and the holes 264b of the auxiliary disks 264 sequentially. Thereafter, the fluid causes the second valve disks 266 to be subjected to bending deformation. Accordingly, a primary blow off occurs at a point A in the damping force graph of FIG. 3. The primary blow off at the point A means that a two-step damping force is generated in the low speed rebound range, which contributes to achieving a gentle and approximately linear damping force graph.

Then, in the high speed rebound range in which the rebound speed of the piston is further increased and therefore the pressure in the rebound chamber 214 is also further increased, the fluid, which causes the second valve disks 266 to be subjected to the bending deformation, causes the third valve disks 268 to be subjected to the bending deformation, which increase the flow rate of the fluid and generates a high speed damping force. Accordingly, a secondary blow off occurs at a point B in the damping force graph of FIG. 3. The primary blow off is preceded in the low or middle-low speed rebound range before the secondary blow off occurs, thereby making it possible to achieve a gentle damping force graph in the high speed rebound range.

Figure 4:
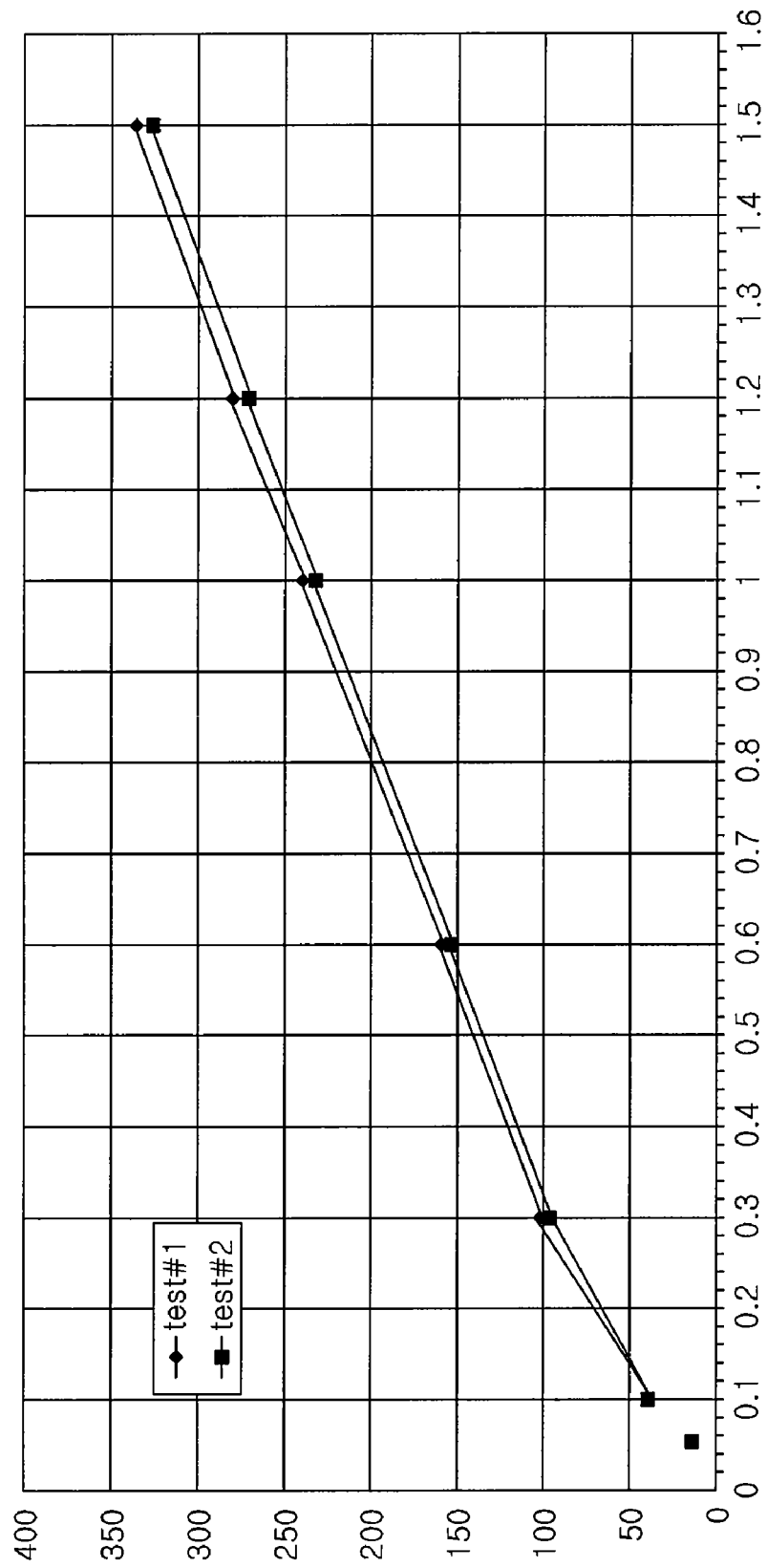
FIG. 4 is a graph showing an actual test result of the shock absorber manufactured according to the embodiment of the present invention.

Therefore, the first valve disk 262, the auxiliary disks 264, the second valve disks 266 and/or the third valve disks 268 are employed in the shock absorber according to the present embodiment, thereby achieving an approximately linear, gentle damping force from the low speed rebound range up to the high speed rebound range. Particularly, the change of the damping force at the points A and B of the primary and secondary blow offs is gentle, which can considerably contribute to the improvement in the ride comfort and handling stability of a vehicle. FIG. 4 shows a damping force graph showing an actual damping force test result of the shock absorber in which the aforementioned valve mechanism is employed. It is noted from FIG. 4 that according to the shock absorber of the present invention, the damping force from the low speed range up to the high speed range is approximately linear.

In the present invention, a structure for generating a two-step damping force is employed in a low speed rebound range of a piston, thereby making it possible to achieve an approximately linear damping force characteristic from a low speed range up to a high speed range. Accordingly, it is possible to significantly improve the ride comfort and handling stability of a vehicle.

Also, the present invention makes it possible to design a shock absorber capable of increasing the damping force in a low speed range without increasing a middle-high speed damping force. Thus, the advantage of a high degree of freedom of tuning a damping force can be further provided.

Further, in the present invention, the combination of a first valve disk and an auxiliary disk removes the necessity of a rebound retainer required in a conventional piston, thereby simplifying the piston and valve mechanism to be embodied.

Although the present invention is described on the basis of the specified embodiment, those skilled in the art can make various modifications, changes and alterations thereto within the spirit and scope of the invention defined by the appended claims. Therefore, the aforementioned descriptions and drawings are not to limit the technical spirit of the present invention, but should be analyzed for illustrative purposes of the present invention.

What is claimed is:

1. A shock absorber, comprising:
   a cylinder defining a compression chamber and a rebound chamber;
   a piston provided between the compression and rebound chambers, the piston having a rebound channel and a valve mechanism to generate a damping force by controlling opening and closing of the rebound channel and an opening degree of the rebound channel,
   wherein the valve mechanism comprises:
   a first valve disk having a hole and a slit communicating with the rebound channel respectively provided in inner and outer sides of the first valve disk, the first valve disk generating a first damping force by directing fluid through the slit;
   an auxiliary disk having a hole communicating with the hole of the first valve disk, the auxiliary disk being disposed to be in contact with a lower side of the first valve disk; and
   a second valve disk disposed to be in contact with a lower side of the auxiliary disk, the second valve disk being configured to be subjected to bending deformation by the fluid flowing through the holes of the first valve disk and the auxiliary disk to generate a second damping force.

2. The shock absorber as claimed in claim 1, further comprising a third valve disk disposed to be spaced apart from the second valve disk, the third valve disk configured to be subjected to bending deformation by the fluid passing the second valve disk to generate a third damping force.

3. The shock absorber as claimed in claim 1, wherein there are a plurality of the auxiliary disks, the inner diameter of the holes of the auxiliary disks being gradually increased in a direction of fluid flow.

4. A shock absorber, comprising:
   a cylinder defining a compression chamber and a rebound chamber;
   a piston provided between the compression chamber and the rebound chamber, the piston having a rebound channel and a valve mechanism to generate a damping force by controlling opening and closing and an opening degree of the rebound channel,
   wherein the valve mechanism comprises:
   a first valve disk having a portion in an outer side thereof to generate a first damping force by directing at least a portion of fluid passing through the rebound channel, and a separate hole communicating with the rebound channel in an inner side of the first valve disk;
   an auxiliary disk having a hole communicating with the hole of the first valve disk, the auxiliary disk being disposed to be in contact with a lower side of the first valve disk; and
   a second valve disk disposed to be in contact with a lower side of the auxiliary disk, the second valve disk being configure to be subjected to bending deformation by the fluid flowing through the holes of the first valve disk and the auxiliary disk to generate a second damping force.

5. The shock absorber as claimed in claim 4, further comprising a third valve disk disposed to be spaced apart from the second valve disk, the third valve disk configured to be subjected to bending deformation by the fluid passing the second valve disk to generate a third damping force.

6. The shock absorber as claimed in claim 4, wherein there are a plurality of the auxiliary disks, the inner diameter of the holes of the auxiliary disks being gradually increased in a direction of fluid flow.

* * * * *